United States Patent [19]

Davis et al.

[11] Patent Number: 4,886,690
[45] Date of Patent: Dec. 12, 1989

[54] PEELABLE BARRIER FILM FOR VACUUM SKIN PACKAGES AND THE LIKE

[75] Inventors: Kent A. Davis, Travelers Rest; Solomon Bekele, Taylors; Henry W. Stockley, Spartanburg, all of S.C.

[73] Assignee: W. R. Grace & Co., Duncan, S.C.

[21] Appl. No.: 136,680

[22] Filed: Dec. 21, 1987

[51] Int. Cl.⁴ .................................................. B32B 1/08
[52] U.S. Cl. .................................. 428/36.6; 428/216; 428/349; 428/516; 428/518; 428/520; 206/631.1
[58] Field of Search ................. 428/35, 349, 516, 518, 428/520, 36.6, 35.4, 216

[56] References Cited

U.S. PATENT DOCUMENTS

| | | |
|---|---|---|
| Re. 27,872 | 1/1974 | Esty . |
| Re. 30,009 | 5/1979 | Perdue et al. . |
| 2,623,826 | 12/1952 | Grinstead . |
| 2,925,346 | 2/1960 | Harper et al. . |
| 3,360,382 | 12/1967 | Miller . |
| 3,491,504 | 1/1970 | Young et al. . |
| 3,574,642 | 4/1971 | Weinke . |
| 3,681,092 | 8/1972 | Titchenal et al. . |
| 3,713,849 | 1/1973 | Grindrod et al. . |
| 4,055,672 | 10/1977 | Hirsch et al. . |
| 4,287,151 | 9/1981 | Esakov et al. . |
| 4,522,835 | 6/1985 | Woodruff et al. . |
| 4,638,913 | 1/1987 | Howe, Jr. . |
| 4,640,856 | 2/1987 | Ferguson et al. ............ 428/35 |
| 4,683,170 | 7/1987 | Tse et al. ..................... 428/35 |
| 4,764,403 | 8/1988 | Ajmera ........................ 428/35 |
| 4,766,018 | 8/1988 | Hinrichsen et al. .......... 428/35 |

FOREIGN PATENT DOCUMENTS

| | | |
|---|---|---|
| 245774 | 2/1963 | Australia . |
| 890766 | 1/1972 | Canada . |
| 1258357 | 2/1960 | France . |
| 1286018 | 1/1961 | France . |
| 1186978 | 4/1970 | United Kingdom . |
| 1199998 | 7/1970 | United Kingdom . |
| 1378140 | 12/1974 | United Kingdom . |

*Primary Examiner*—Edith Buffalow
*Attorney, Agent, or Firm*—William D. Lee, Jr.; Mark B. Quatt; Jennifer Skord

[57] ABSTRACT

A vacuum skin package for packaging fresh red meat and like articles is produced by using a composite, multilayer, oxygen barrier, vacuum skin packaging forming film in which the barrier layer can be manually separated from the non-barrier, oxygen permeable layer. After the vacuum skin package is formed to enclose a fresh red meat product in a vacuum the meat will have a purplish color. Then, after storage, the barrier layer can be removed so that the remaining permeable film can admit oxygen to impart the desirable red bloom to the fresh meat. Of importance is the "tear through" feature of the permeable inner layer which has a greater bond strength to the tray than internal strength or layer-to-layer bond strength so that a tab may be torn loose at a score line and then the barrier layer may be readily delaminated and peeled from the permeable layer.

12 Claims, 1 Drawing Sheet

PEELABLE BARRIER FILM FOR VACUUM SKIN PACKAGES AND THE LIKE

FIELD OF THE INVENTION

This invention relates generally to thermoformable barrier films and to vacuum skin packages which can be made therefrom. Particularly, the present invention relates to multi-layer gas barrier films wherein the barrier layer or layers may be peeled and separated from the gas permeable layer or layers.

BACKGROUND OF THE INVENTION

Skin packaging can be classified as a vacuum forming process for thermoformable polymeric films. The product on a supporting member serves as the mold for the thermoformable film which is formed about the product by means of differential air pressure. However, the term "vacuum skin packaging" or VSP as it is referred to hereinafter, refers not to the fact that the thermoformable film is formed around the product by vacuum or differential air pressure but to the fact that the product is packaged under vacuum and the space containing the product is evacuated. Thus, there is a need for the film formed around the product and for the support member to be a barrier to oxygen, air, and other gases.

In conventional skin packaging, a backing board which is porous or which is perforated so that a vacuum may be drawn directly through the backing board is employed. In vacuum skin packaging processes generally a vacuum chamber with an open top is used. The product on an impervious backing board is placed on a platform within the vacuum chamber. The top of the chamber is covered by a sheet of film which is clamped tightly against the chamber to form a vacuum tight closure. The chamber is evacuated while the film is heated to its forming and softening temperature. The platform is then raised to drive the product into the softened film and air pressure can be used above the film to force it tightly around the product. A process of this type is disclosed in French Patent No. 1,258,357 which issued to Alain G. Bresson on Mar. 6, 1961.

A variant of the process described in the Bresson patent is disclosed in French Patent No. 1,286,018 which issued on Jan. 22, 1962 to LaRoach Freres Limited. In the the LaRoach Freres process, after the chamber has been evacuated and the product driven into the heat softened film, the vacuum is released and ambient air is permitted to enter the chamber so that the thermoplastic film molds more or less onto the product since there is a vacuum on the product side of the film and ambient air pressure on the other side of the film. Australian Patent No. 245,774 which issued to Colbros Proprietary Limited et al on July 16, 1967 discloses a vacuum skin packaging process in which an article to be packaged is inserted within the lower half of a vacuum chamber on a backing board, a thermoplastic film is placed over the open face of the lower half of the chamber, the chamber is closed and both halves and are brought to essentially the same state of vacuum, the film is heated and softened, and then atmospheric air is introduced into the upper half of the chamber so that it alone forces the thermoplastic film down around the product and against the backing board.

Another prior art version of vacuum skin packaging is disclosed in U.S. Pat. No. 3,491,504, which issued to W. E. Young et al on Jan. 27, 1970, heat softened film is physically moved down over a stationary product and, in connection with air pressure, the softened thermoplastic film is molded onto the product.

In U.S. Pat. No. RE.30,009, which was reissued on May 29, 1979 to Richard R. Perdue et al, a thermoformable or heat softenable film sheet is drawn by differential air pressure against the concave interior surface of the upper portion of a vacuum chamber, the film is then heated by surface contact, and then, after evacuation of the chamber, air pressure is used to blow the heat softened film down over the product and against the backing board. The resulting package comprises the product positioned on the backing board which is gas impervious and the product is held there by the thermoformable film which has been formed around the product in the exact shape of the product so that it appears to be a "skin." The thermoformable film, as stated previously, is also gas impervious and usually will consist of a number of layers each of which performs a specific function. The product contact and backing member contact layer will be a sealing or heat sealable layer, an interior layer will typically be a barrier layer which comprises a vinylidene chloride copolymer (PVDC) or a hydrolyzed ethylene/vinyl-acetate copolymer (EVOH), and the outer surface layer will be an abuse layer to protect the barrier layer from scratches, pin holes, or from moisture attack. Accordingly, one general object of the present invention is to provide an improved thermoformable film for use in vacuum skin packaging processes.

In U.S. Pat. No. 3,574,642 which issued on Apr. 13, 1971 to Carl Frederick Weinke, a package for and a method of packaging meats is disclosed. The package includes an inner oxygen-permeable member which may be either gas flushed or evacuated and an outer oxygen-impermeable member which may also be gas flushed or evacuated. The package preserves the freshness of the meat until the meat is ready to be marketed to the consumer. For marketing, the outer wrapper is removed and the inner package is displayed at the meat counter for the consumer. Being oxygen-permeable, the inner wrapper admits oxygen to the interior of the package causing the fresh meat product to change to a bright red color which the consumer associates with freshness. The inner pouch of the Weinke package may consist of polyethylene film and the outer pouches may be cellophane film with a coating of saran (vinylidene chloride copolymer or PVDC.) Another patent showing portions of fresh meat individually packaged in oxygen permeable plastic film and inserted into an outer container of impermeable film is U.S. Pat. No. 3,681,092 which issued to Oliver R. Titchness et al on Aug. 1, 1972.

Another prior art package is described in U.S. Pat. No. 3,713,849 which issued to Paul E. Grindrod et al on Jan. 30, 1973. In the Grindrod et al patent a fresh meat package having an outer oxygen impermeable lamina which is readily and entirely peelable from an inner oxygen-permeable lamina is disclosed. The package includes means for initiating the peeling separation along an edge of the package. The outer oxygen barrier maintains meats in well preserved condition in spite of the purplish color which has low consumer appeal. Shortly prior to display for sale to the consumer the outer lamina is removed by the retailer and the product develops a healthy, bright red "bloom" due to the high rate of oxygen permeation through the inner remaining film package. The material disclosed in Grindrod et al is a laminate of PVC/Saran and EVA/Saran. (EVA designates ethylene/vinyl-acetate copolymer and PVC designates polyvinyl-chloride.) The EVA and PVC layers are the inner layers and at the periphery of the package they are sealed together but form a weak bond. The saran layers can be readily peeled from the respective EVA or PVC layers as saran does not form a strong bond between either. Gripping tabs are also provided.

Yet another peelable package is shown in U.S. Pat. No. 4,055,672 which issued on Oct. 25, 1977 to Arthur Hirsch et al. In the Hirsch et al patent a semi-rigid tray of oxygen impermeable material is formed, a meat product placed therein, and then the tray is sealed around its upper periphery or flange area by a composite lid which has an inner layer of oxygen permeable material, an adhesive layer, and an outer layer of oxygen impermeable material. When the package is ready for retail display so that oxygen can reach the fresh meat packaged within the tray, the outer impermeable lid is peeled away so that the oxygen can penetrate through the remaining oxygen permeable portion of the lid. Accordingly, another object of the present invention is to provide a package with a strippable or peelable barrier layer which is an improvement over prior art packages.

In a number of instances in order to preserve a meat product within an impermeable film, it is desirable to provide a modified atmosphere which may include inner gases such as nitrogen or the like or an atmosphere which has a mixture of gases such as oxygen and carbon dioxide to control the bacterial growth within a package. Typical packages are disclosed in U.S. Pat. No. RE.27,872 which issued on Jan. 8, 1974 to J. J. Estes; U.S. Pat. No. 2,623,826 which issued on Dec. 30, 1952 to Sanford R. Grinstread; U.S. Pat. No. 3,360,382 was issued on Dec. 26, 1967 to H. V. Miller; U.S. Pat. No. 4,522,835 which issued on June 11, 1985 to Richard E. Woodriff; U.K. Pat. No. 1,199,998 which was published July 22, 1970; Canadian Patent No. 890,766 which issued Jan. 18, 1972 to Charles M. Davison et al; U.K. Patent No. 1,378,140 which was published Dec. 18, 1974; and in U.K. Patent No. 1,186,978 which was published Apr. 8, 1970. U. S. Pat. No. 2,925,346 which issued Feb. 16, 1960 discloses a process of packaging cured meat products and inhibiting color degradation by removing oxygen and back filling the container with a gaseous oxide of nitrogen. Accordingly, it is another object of the present invention to provide a vacuum skin package which is suitable for and can be used with modified atmospheres.

In order to readily open packages where plastic film layers have been sealed together to close the package, various tear tabs and easy open mechanisms have been devised. One such easy-to-open, delaminating seal is disclosed in U.S. Pat. No. 4,638,913 which issued on Jan. 27, 1987 to Milton A. Howe, Jr. In this patent, two grippable film folds are provided and the folds when pulled apart will rupture one of the outer layers of the sealed together film and delaminate the film to its edge. In such a case, of course, the bond strength between the two sealed together films must be greater than the layer-to-layer bond of the film. Accordingly, it is still another object of the invention to provide a package which it is readily openable.

The foregoing and other objects are achieved by the present invention which is described in the Summary of Invention below, shown in the attached Drawings, and further described in the Detailed Description.

SUMMARY OF THE INVENTION

In one aspect, the present invention is a peelable barrier film for vacuum skin packaging and the like comprising a coextruded, multi-layer forming web or composite film comprising a gas permeable film and a gas impermeable film which can be manually delaminated from each other, said gas permeable film comprising a plurality of layers including a heat sealable, polymeric layer, and, a layer comprising a linear ethylene/alpha-olefin copolymer having a density of less than 0.915 g/cc. and, said multi-layer gas impermeable film comprising a plurality of layers including a barrier layer comprising a material selected from the group consisting of hydrolyzed ethylene/vinylacetate copolymers (EVOH) said barrier layer being immediately adjacent to and in contact with said linear ethylene/alpha-olefin copolymer so that when delamination occurs the barrier layer will become a first surface layer, and, an outer or second surface layer of polymeric material; and, said heat sealable layer being capable of sealing to a polymeric surface with a bond strength greater than the force required to delaminate said permeable layer from said impermeable layer.

In another aspect, the multi-layer gas impermeable film of said composite peelable film is a film wherein the barrier is EVOH and the gas permeable film includes at least two internal layers between the two surface layers, one of said layers being an adhesive layer and the other layer being a second barrier layer comprising EVOH, said adhesive layer being positioned between the two EVOH layers.

In yet another aspect, the peelable film of the present invention requires that the bond strength between the heat sealable layer and the polymeric surface is greater than the force required to rupture or tear the multi-layer permeable film so that the permeable film which has the heat sealable layer will rupture in a predetermined fashion rather than delaminate or peel from the polymeric surface to which it has been bonded.

In another aspect, the heat sealing layer is selected from the group consisting of linear ethylene/alpha-olefin copolymers having a density of less than 0.910 grams/cc (VLDPE) and ethylene/vinyl-acetate copolymers (EVA) having a vinyl-acetate content in the range of from 4% to 12%.

In yet another aspect, the present invention is an improvement in the process of making a peelable barrier film which comprises a multi-layer, heat sealable composite film for thermoforming around a product to be packaged in a vacuum skin packaging operation, and the improvement comprises coextruding a multi-layer layer film having two internal layers comprising EVOH, one internal layer having an adhesive layer disposed on each side thereof and the other EVOH layer having an adhesive layer disposed on one side with a layer comprising VLDPE or ULDPE on the other side whereby said film may be readily delaminated and peeled apart between said EVOH and ULDPE layers.

In still other aspects, the present invention includes a novel vacuum skin package formed from the above described films.

DESCRIPTION OF THE DRAWINGS

In the drawings which are appended hereto and made a part of this disclosure.

DEFINITIONS

Figure 1:
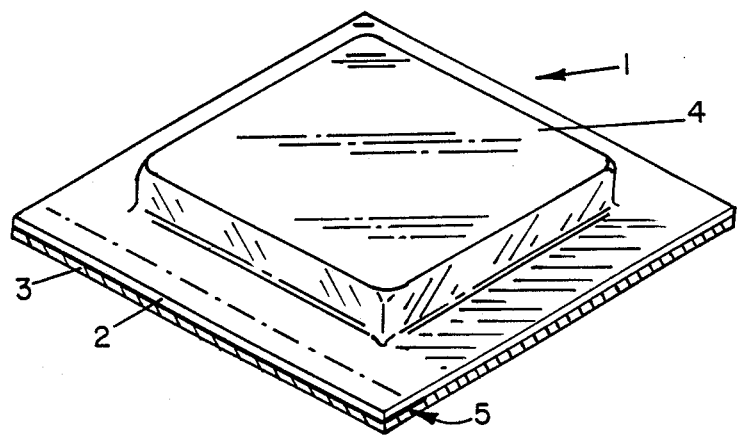
FIG. 1 is a perspective view of one embodiment of a vacuum skin package which can be made using the film and process of the present invention.

As used herein, the following abbreviations and terms have the meanings defined below:

EVA: EVA designates ethylene/vinyl-acetate copolymers.

HDPE: HDPE designates high density polyethylene resins. Such resins are generally made by the low pressure process and have a density of greater than 0.940 g/cc.

LLDPE: LLDPE means linear low density polyethylene which generally is understood to include that group of ethylene/alpha-olefin copolymers having limited side chain branching and which fall into a density range of 0.910 to 0.940 g/cc. Sometimes linear polyethylene in the density range from 0.926 to 0.940 is referred to as linear medium density polyethylene (LMDPE). Typical brand names are Dowlex from Dow Chemical Company, Ultzex and Neozex from Mitsui Petro Chemical Company, and Sclair from duPont. The alphaolefin copolymers are typically butene-1, pentene-1, hexene-1, octene-1, etc.

VLDPE and ULDPE: Very low density polyethylene (VLDPE) and ultra-low density polyethylene (ULDPE) mean ethylene/alpha-olefin copolymers which have a density of less than about 0.915 and, more specifically, usually 0.912 or below and may be below 0.89. Typical VLDPE resins are those designated DFDA by Union Carbide and are believed to principally or usually have butene, or isobutene as a comonomer. The very low density polyethylenes as compared to LLDPE, usually have significantly higher copolymer content and distinctly different properties making them a distinct class of polymers. Typically, resins designated "ULDPE" resins come from Dow and are believed to have octene as the comonomer. There is a slight difference in properties which is thought to be attributable to the comonomer. As used herein the term "linear ethylene/alpha-olefin copolymer having a density of less than 0.915 g/cc" encompasses both VLDPE and ULDPE. (See "Plastics Technology Magazine" for September, 1984 at Page 113 where an article entitled, "INTRODUCING VERY LOW DENSITY PE" appears.)

EVOH: EVOH means ethylene-vinyl alcohol, sometimes abbreviated "EVAL" or hydrolyzed ethylene/vinyl-acetate and sometimes abbreviated "HEVA." EVOH resins are noted for their very good gas barrier properties but tend to be quite moisture sensitive. Typical suppliers of resins are Evalca in the United States and Toya Seiken in Japan..

BARRIER or "Impermeable Material:" BARRIER, as used herein, means a gas barrier having an oxygen transmission rate, for example, of less than 40 milliliters of oxygen per square meter for 24 hours as set forth in the above mentioned U.S. Pat. No. 3,574,642 for packaging fresh raw meat. Oxygen permeation rates considerably less than 40 can be achieved but for the purposes of this invention a film having a permeation rate of less than 40 will be considered a BARRIER or impermeable film or material.

PERMEABLE MATERIAL: An oxygen or gas permeable material will be one having an oxygen permeation rate in excess of about 2,000 milliliters of oxygen per square meter for 24 hours. Obviously it is desirable to have as high a permeation rate as possible if the object is to introduce oxygen to the product when the barrier film is peeled away.

OPTICAL LAYER: As used herein, an optical layer of a multi-layer film designates a layer included to enhance the appearance characteristics or a film so that a product packaged in the film will have a better appearance.

LDPE: LDPE designates branched chain polyethylene made by the high pressure process and will have a density below 0.940 g/cc and, most often a density of 0.915 to 0.925 as the 0.926 to 0.939 range is often referred to as the medium density range.

DETAILED DESCRIPTION

Turning now to the description of the invention reference is first made to FIG. 1 where vacuum skin package 1 is shown. This package comprises a support member 3 which is a gas impermeable member preferably formed of polyvinyl chloride material (PVC) as a substrate material coated with a barrier material and a heat sealing material; or, it can be a material such as a polystyrene foam which also is coated with a barrier material and a heat sealing material. Typical heat sealing materials are branched low density polyethylene (LDPE), ionomers such as the Surlyn brand sold by duPont, and EVA copolymers. The support member 3 may be flat as shown or it may be formed in the shape of a tray.

The product 4 positioned on the support member 3 will, in general, be a food product such as fresh red meat. Particularly, the prime cuts of beef, pork, and lamb would be the preferred food products. When these products are vacuum skin packaged or packaged in an atmosphere in the absence of oxygen the fresh meat will tend to turn a purplish color and remain that way as long it is chilled and kept out of contact with oxygen. The bright red "bloom" is restored when the meat makes contact with oxygen again.

Figure 4:
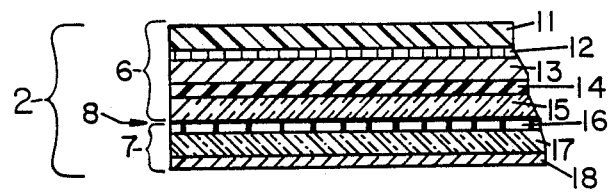

The thermoformable film 2 which covers the product 4 and is sealed around the perimeter of the product in a manner to assume the exact shape of the product and, thus, become a "skin" is a composite film and is shown in greater detail in FIG. 4. In FIG. 4, which is a schematic representation of the layers in film 2, the two films 6 and 7 which make up the composite 2 are shown bonded at interface 8. Film 2 is preferably coextruded and as shown eight layers are coextruded together. The two layers 15 and 16 which form the interface 8 are materials which do not readily adhere one to the other and form a relatively weak bond. Preferred materials are PVDC and EVOH for layer 15 and LLDPE for layer 16. When the barrier or gas impermeable film employs a layer of PVDC as the barrier layer usually only an abuse layer 11 need be added with a suitable internal adhesive layer. This abuse material can be nylon, high density polyethylene, EVA, polypropylene, or the like. In some instances it may be necessary to have an adhesive layer and the selection of a proper adhesive is well within the skill of those in the art.

In a preferred embodiment, in order to achieve very good barrier properties, two layers of EVOH are employed. The first layer 15 is the interface layer with layer 16 and the second layer 13 of EVOH is disposed between two adhesive or tie layers 12 and 14. The adhesive layer 12 is adhered to an abuse layer 11. Since the EVOH layer 13 is an interior layer it is Protected from moisture attack and will retain its low oxygen permeability. Thus, even if moisture were to penetrate the weak bond between layers 15 and 16 at interface 8 during storage under moist conditions and significantly degrade the barrier properties of layer 15, layer 13 would be protected and would maintain the excellent barrier properties of the composite film.

The gas permeable film 7 comprises an interface layer 16 of ULDPE. The center or core layer 17 of the permeable film 7 is EVA having 18% to 28% VA or an alternate material is VLDPE.

The specific best mode of the forming web for vacuum skin packaging and the like which is separable into permeable and impermeable films has as the permeable skin film or layer 7 a construction as follows:

Sealant Layer (18)/Core Layer (17)/Optical Layer (16)
0.20–0.60        1.75–2.50        0.10–0.20 mils thickness Wherein:
Sealant=VLDPE from Union Carbide, or,
 EVA copolymer having 4% to 12% VA from duPont
Core=VLDPE, or,
 EVA copolymer having 18% to 28% VA content
Optical=ULDPE from Dox, resins 4002A or 4002B The impermeable or peelable barrier film has the following construction:

EVOH/LDPE(tie) + HDPE/EVOH/LDPE(tie) + HDPE/EVA/HDPE(outside)
   / 40%       60% /    / 40%       60% /
0.20      0.20      0.20      0.20      1.50  0.20   Thickness (mils)

Wherein:
EVOH=ethylene/vinyl-alcohol from Evalca
LDPE(tie)=Adhesive, preferably Bynel from duPont
EVA=EVA copolymer having 18% VA
HDPE=High density PE from USI Using the best mode web, retail shelf lives between 23 and 28 days have been achieved for T-bone steak cuts whereas with the single layer of EVOH only about a seven day shelf life can be expected. It has also been found that the interface of EVOH/ULDPE between the permeable and impermeable films provides the easiest delamination or peeling of the barrier or impermeable film. Furthermore, the LDPE based tie or adhesive provides the best combination of adhesion to the EVOH layers plus moisture protection of the EVOH.

To make the composite film or web, a coextrusion process similar to that described in U.S. Pat. No. 4,287,151 to Esakov et al on Sept. 1, 1981 may be employed. Suitable annular multi-layer dies must, of course, be used and these are well known in the art.

In an alternate structure which has fewer layers, the impermeable film 6 will be three layers, e.g., layers 11, 12, and 13 thus eliminating layers 14 and 15. Layer 13 is the barrier layer and is EVOH containing 32% to 44% ethylene. Layer 12 would is a blend of EVA with a modified EVA which is modified to serve specifically as an adhesive. One of the EVA based Plexar resins from Chemplex Company is preferred. The abuse or outer layer is HDPE. The permeable film 7 comprises branched low density polyethylene (LDPE), the core layer is EVA having 18% to 29% VA and the sealing layer comprises EVA having 2% to 4% vinyl-acetate content. In this alternate embodiment, the low density polyethylene (LDPE) interface with the EVOH layer is a weak coextruded bond which can be readily peeled apart. While this alternate structure does not provide the same moisture protection for the EVOH layer, it is nonetheless adequate for many applications.

Figures 2, 3:
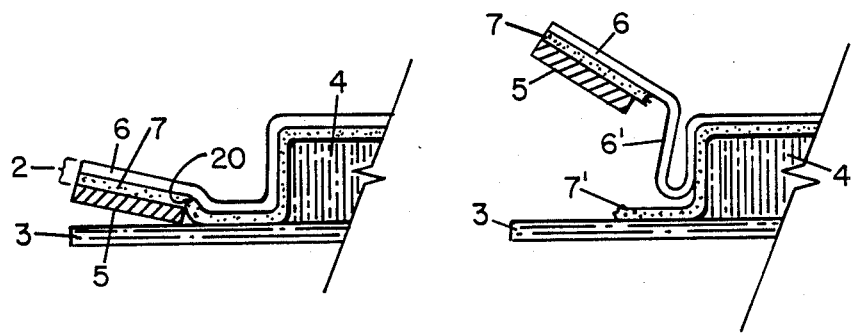
FIG. 2 shows one embodiment of a tab arrangement for delaminating or peeling apart the two films comprising the composite peelable film of the present invention.
FIG. 3 shows the peeling process shown in FIG. 2 underway after rupture of a portion of the permeable film has taken place; and, FIG. 4 is a schematic cross section of the composite film of the present invention.

Looking now at FIGS. 2 and 3 tab 5 has been laid across one edge of the vacuum skin package as can be seen by the dotted line in FIG. 1 so that in forming of upper web 2, the composite film, around product 4, it does not adhere to the supporting web or film 3. This allows for a tab to form as can be seen in FIG. 2 that can be gripped and moved upwardly by the fingers to a position shown in FIG. 3. In this position it can be seen that the permeable film 7 has torn or ruptured rather than break loose or delaminate its bond with the support member 3. This leaves the film portion 7' firmly adhered to the support member 3. This type of strong bond is formed between the VLDPE or EVA surface of the film 7 with the coated PVC of the support member. Surfaces such as LDPE, EVA, and ionomers adhere strongly to each other and their bond strength is greater than the internal cohesive strength of film 7.

Also seen in FIG. 3 is the beginning of the delamination of the permeable film 6 from the impermeable film 7. The already peeled apart portion 6' has separated from the bonded portion 7' so that the entire impermeable film 6 may be peeled from the permeable film 7 leaving the inner "skin" package comprising support member 3, peeled, permeable film 7', and product 4.

When product 4 is a fresh red meat product, it will, within half an hour to an hour, regain its bright red bloom and is then ready for display in a showcase.

Upon reading and becoming familiar with the disclosure herein, equivalent layer combinations and packages will likely become evident or obvious to those skilled in the art. However, the present invention is to be limited only by the scope of the following claims:

We claim:

1. A forming web for vacuum skin packaging and the like which web is separable into permeable and impermeable films comprising:
 (A) a coextruded, multi-layer composite film web comprising a gas permeable film and a gas impermeable film which can be manually delaminated from each other;
  (1) said gas permeable film having a plurality of layers including:
   (a) a heat sealable layer selected from the group consisting of ethylene polymers, copolymers, and blends thereof; and,
   (b) a layer comprising a linear ethylene/alpha-olefin copolymer having a density of less than 0.915 gms/cm$^3$ and,
  (2) said multi-layer gas impermeable film comprising a plurality of layers including:
   (a) a barrier layer comprising a material selected from the group consisting of hydrolyzed ethylene vinyl acetate copolymers (EVOH) and vinylidene chloride copolymers or terpolymers (PVDC), said barrier layer being immediately adjacent to and in contact with said linear ethylene/alpha-olefin copolymer (1) (b) so that when delamination occurs the barrier layer will become a first surface layer; and, (b) an outer or second surface layer of polymeric material; and, (B) said heat sealable layer being capable to sealing to a polymeric surface with a bond strength greater than the force required to rupture and subsequently delaminate said permeable layer from said impermeable layer.

2. The film of claim 1 wherein the barrier film which forms the first surface layer comprises EVOH and said multi-layer gas impermeable film includes at least two internal layers between the two surface layers, one of said layers being an adhesive layer and the other layer being a second barrier layer comprising EVOH, said adhesive layer being positioned between said two EVOH layers.

3. The film of claim 2 wherein the multi-layer gas impermeable film comprises: (i) a first surface or barrier layer comprising EVOH; (ii) a second or internal barrier layer comprising EVOH; (iii) adhesive layers on each side of said second barrier layer; (iv) an outer or second surface layer of high density polyethylene.

4. The film of claim 2 wherein the multi-layer or gas permeable film comprises: (i) a heat sealing layer comprising a polymer selected from the group consisting of linear ethylene/alpha-olefin copolymers having a density of less than 0.915 g/cc and ethylene/vinyl-acetate compolymers having a vinyl-acetate content in the range from 4% to 12%.

5. A film according to claim 4 wherein the gas impermeable film has a thickness in the range of 3.0 to 3.5 mils and the permeable film has a thickness in the range of 1.5 to 3.0 mils.

6. A film according to claim 5 wherein the adhesive layer compresses a blend of an LDPE based adhesive and HDPE.

7. A vacuum skin package wherein the forming web is a film according to claim 1.

8. In the process of making a barrier film which comprises a multi-layer, heat sealable composite film for thermoforming around a product to be packaged in a vacuum skin packaging operation or similar processes, the improvement which comprises coextruding a multi-layer film having two internal layers comprising EVOH, one internal EVOH layer having an adhesive layer disposed on each side thereof and the other EVOH layer having an adhesive layer disposed on one side thereof with a layer comprising a linear ethylene/alpha olefin copolymer with a density of less than 0.915 g/cc on the other side thereof whereby said film may be readily delaminated and peeled apart between said EVOH and linear ehtylene/alpha-olefin copolymer layers.

9. The process of claim 8 wherein said adhesive layer comprises a blend of LDPE based adhesive blended with high density polyethylene.

10. A multi-layer, gas barrier packaging film comprising:
(a) first EVOH layer;
(b) a tie layer on each side of said EVOH layer, said tie layers comprising a blend of a LDPE based adhesive with high density polyethylene polyethylene;
(c) a second EVOH layer; and
(d) said first and second EVOH layers being positioned between two outer layers selected from the group consisting of ethylene polymers, copolymers, and blends thereof.

11. The film of claim 10 wherein a layer comprising a linear ethylene/alpha-olefin copolymer having a density of about 0.910 g/cc or less is immediately adjacent the side of the second EVOH layer which is opposite to the side on which the first EVOH layer is positioned.

12. A composite, thermoformable web for vacuum skin packages and the like comprising:
(a) a sealant layer having a thickness in the range of about 0.20 to 0.60 mils and comprising a polymeric material selected from the group consisting of linear ethylene/alpha-olefin copolymers having a density of about 0.910 g/cc or less and ethylene/vinyl-acetate content in the range of 4% to 12% by weight, said sealant layer being one surface layer;
(b) a core layer having a thickness in the range of about 1.75 to 2.50 mils and comprising a polymeric material selected from the group consisting of linear ethylene/alpha-olefin copolymers having a density of about 0.910 g/cc or less (VLDPE) and ethylene/vinyl-acetate copolymers having a vinyl acetate content in the range of 18% to 28% by weight, said core layer being adjacent to said sealant layer;
(c) an optical layer having a thickness in the range of about 0.10 to 0.20 mils and comprising a polymeric material selected from the group consisting of VLDPE resins, said optical layer being adjacent said core layer,
(d) a first EVOH layer having a thickness in the order of 0.20 mils and being adjacent to said optical layers and being manually peelable therefrom along with layers (e) through (i);
(e) a first tie layer comprising a blend of about 40% of weight of an LDPE based adhesive with about 60% by weight of HDPE, said tie layer having a thickness of approximately 20 mils and being adjacent said first EVOH layer;
(f) a second EVOH layer having a thickness of approximately 0.20 mils and being adjacent said first tie layer;
(g) a second tie layer having a thickness of approximately 0.20 mil and comprising the same material as the first tie layer, said second tie layer being adjacent said second EVOH layer;
(h) a layer comprising ethylene/vinyl-acetate copolymer (EVA) having a vinyl acetate content of approximately 18% by weight, said layer being adjacent said second tie layer and being approximately 1.5 mils in thickness; and
(i) a layer comprising HDPE adjacent said EVA layer, said layer being approximately 0.20 mils thick and being an outside layer.

* * * * *